(12) United States Patent
Keithley et al.

(10) Patent No.: US 8,489,559 B2
(45) Date of Patent: Jul. 16, 2013

(54) METHODS AND APPARATUS FOR CONVERSION OF CONTENT

(75) Inventors: Kaleb Keithley, Belmont, MA (US); Jiri Schindler, Huntington Avenue (JM); Jonathan B Hall, Belmont, MA (US); Michael Kilian, Harvard, MA (US); Stephen J. Todd, Shrewsbury, MA (US)

(73) Assignee: EMC Corporation, Hopkinton, MA (US)

( * ) Notice: Subject to any disclaimer, the term of this patent is extended or adjusted under 35 U.S.C. 154(b) by 607 days.

(21) Appl. No.: 12/804,349

(22) Filed: Jul. 20, 2010

(65) Prior Publication Data

US 2010/0293561 A1  Nov. 18, 2010

Related U.S. Application Data

(63) Continuation of application No. 11/438,770, filed on May 23, 2006, now abandoned, and a continuation-in-part of application No. 10/911,330, filed on Aug. 4, 2004, now Pat. No. 8,069,269.

(51) Int. Cl.
*G06F 7/00* (2006.01)
*G06F 17/00* (2006.01)

(52) U.S. Cl.
USPC .......................................... 707/690; 707/756

(58) Field of Classification Search
USPC .......... 707/705, 736, 756, 999.001, 999.002, 707/999.01, 999.2, 999.201, 687, 690
See application file for complete search history.

(56) References Cited

U.S. PATENT DOCUMENTS

| 5,488,702 | A  | * | 1/1996  | Byers et al. ..................... 726/26 |
| 5,675,789 | A  | * | 10/1997 | Ishii et al. ...................... 707/204 |
| 6,173,291 | B1 | * | 1/2001  | Jenevein ........................ 707/200 |
| 6,549,918 | B1 | * | 4/2003  | Probert et al. ................. 707/203 |
| 6,567,826 | B1 | * | 5/2003  | Fischer et al. ................ 707/202 |
| 7,263,521 | B2 | * | 8/2007  | Carpentier et al. ............... 707/4 |

\* cited by examiner

*Primary Examiner* — Marc Somers
(74) *Attorney, Agent, or Firm* — Muirhead and Saturnelli, LLC (57) ABSTRACT

In one embodiment of the invention, a utility may be installed (e.g., by a system administrator) on a storage system. The utility may read content units on the storage system that are stored in one data format, and convert the content units to a second data format. In one embodiment, in response to a read request for a content unit, a data format in which to return the content unit may be selected and the content unit may be returned in that data format. In another embodiment, mapping information may be created that specifies in which data format a content unit should be returned in response to a request for the content unit. The mapping information may be stored either on the storage system that stores the content unit, the computer requesting access to the content unit, or any other computer or device in the computer system.

14 Claims, 8 Drawing Sheets

METHODS AND APPARATUS FOR CONVERSION OF CONTENT

RELATED APPLICATIONS

This application is a continuation of U.S. application Ser. No. 11/438,770 filed May 23, 2006 now abandoned and is a continuation-in-part of U.S. application Ser. No. 10/911,330 filed Aug. 4, 2004 now U.S. Pat. No. 8,069,269, which are hereby incorporated by reference.

FIELD OF THE INVENTION

The present invention relates to the conversion of content.

DESCRIPTION OF THE RELATED ART

Virtually all computer application programs rely on storage that may be used to store computer code and data manipulated by the computer code. A typical computer system includes one or more host computers that execute such application programs and one or more storage systems that provide storage.

The host computers may access data by sending access requests to the one or more storage systems. Some storage systems require that the access requests identify units of data to be accessed using logical volume and block addresses. Such storage systems are known as "block I/O" storage systems. Although the logical volumes presented by the storage system to the host may not map in a one-to-one manner to physical storage devices, they are perceived by the host as corresponding to physical storage devices, and the specification of a logical volume and block address indicates where the referenced data is physically stored within the storage system.

In contrast to block I/O storage systems, some storage systems receive and process access requests that identify a data or other content unit using an object identifier, rather than an address that specifies where the data unit is physically or logically stored in the storage system. Such storage systems are referred to as object addressable storage (OAS) systems. In object addressable storage, a content unit may be identified (e.g., by host computers requesting access to the content unit) using its object identifier and the object identifier may be independent of the physical or logical location at which the content unit is stored (although it is not required to be). However, from the perspective of the host computer (or user) accessing a content unit on an OAS system, the object identifier does not control where the content unit is stored. Thus, in an OAS system, if the physical or logical location at which the unit of content is stored changes, the identifier by which host computers access the unit of content may remain the same. In contrast, in a block I/O storage system, if the physical or logical location at which the unit of content is stored changes, host computers accessing the unit of content may need to be made aware of the location change and then use the new location of the content unit of content for future accesses.

One example of an OAS system is a content addressable storage (CAS) system. In a CAS system, the object identifiers that identify content units are content addresses. A content address is an identifier that is computed, at least in part, from at least a portion of the content of its corresponding unit of content, which can be data and/or metadata. For example, a content address for a unit of content may be computed by hashing the unit of content and using the resulting hash value as the content address. Storage systems that identify content by a content address are termed content addressable storage (CAS) systems.

SUMMARY OF THE INVENTION

One embodiment of the invention is directed to a method for use in a computer system comprising at least one storage system and at least one host computer that is coupled to the at least one storage system and executes an application program that writes a plurality of content units to the at least one storage system, wherein the at least one storage system stores the plurality of content units in a first stored format. The method comprises: (A) executing on at least one computer other than the at least one host computer at least one utility that reads at least some of the plurality of content units and stores the at least some of the plurality of content units on the at least one storage system in a second stored format that is different from the first stored format.

Another embodiment of the invention is directed to a method for use in a computer system comprising at least one storage system and at least one host computer that is coupled to the at least one storage system and executes an application program that writes a plurality of content units to the at least one storage system, wherein the at least one storage system stores the plurality of content units in a first stored format. The method comprises: (A) installing on at least one computer other than the at least one host computer at least one utility that can read at least some of the plurality of content units and store the at least some of the plurality of content units on the at least one storage system in a second stored format that is different from the first stored format.

A further embodiment is directed to a method for use in a computer system comprising at least one storage system that stores a plurality of content units and has the ability to respond to a request to access at least one of the plurality of content units by returning the at least one of the plurality of content units in any of at least two formats comprising at least a first format and a second format that is different than the first format, wherein the at least one storage system comprises an interface that enables each of the plurality of content units to be stored on the at least one storage system, associated with an identifier and later retrieved by providing the at least one storage system with the identifier. The method comprises acts of: (A) in response to at least one request to read the at least one of the plurality of content units being received at the at least one storage system, selecting one of the formats of the at least one of the plurality of content units based, at least in part, on information associated with the at least one request; and (B) providing, from the at least one storage system, the at least one of the plurality of content units in the format selected in the act (A).

Another embodiment is directed to a storage system comprising: at least one storage device to store a plurality of content units written to the at least one storage system; and at least one processor programmed to; provide an interface to the at least one storage system that enables each of the plurality of content units to be stored on the at least one storage system, associated with an identifier and later retrieved by providing the at least one storage system with the identifier, wherein each of the plurality of content units is stored in a stored format; and in response to at least one request to read the at least one of the plurality of content units being received at the at least one storage system, select one of the formats of the at least one of the plurality of content units based, at least in part, on information associated with the at least one request and provide the at least one of the plurality of content units in the format selected.

A further embodiment is directed to a method for use in a computer system comprising at least one storage system that stores a plurality of content units and comprises an interface that enables each of the plurality of content units to be stored on the at least one storage system, associated with an identifier and later retrieved by providing the at least one storage system with the identifier. The method comprises acts of: installing on at least one storage system at least one utility that provides the at least one storage system with the ability to perform acts of: (A) in response to at least one request to read at least one of the plurality of content units being received at the at least one storage system, selecting any of at least two formats, comprising at least a first format and a second format that is different than the first format, in which the at least one of the plurality of content units can be provided, the act of selecting being based, at least in part, on information associated with the at least one request; and (B) providing, from the at least one storage system, the at least one of the plurality of content units in the format selected in the act (A).

Another embodiment is directed to a method for use in a computer system comprising at least one storage system that stores a plurality of content units and has the ability to respond to a request to access at least one of the plurality of content units by returning the at least one of the plurality of content units in any of a plurality of formats comprising at least a first format and a second format that is different than the first format, wherein the at least one storage system comprises an interface that enables each of the plurality of content units to be stored on the at least one storage system, associated with an identifier and later retrieved by providing the at least one storage system with the identifier. The method comprises acts of: (A) providing from the at least one host computer, in association with at least one request to read at least one of the plurality of content units, information that enables the at least one storage system to select one of the plurality of formats in which to provide the at least one of the plurality of content units to the at least one host computer in response to the at least one request.

A further embodiment is directed to a method for use in a computer system comprising at least one storage system that stores a plurality of content units and has the ability to respond to a request to access at least one of the plurality of content units by returning the at least one of the plurality of content units in any of a plurality of formats comprising at least a first format and a second format that is different than the first format, wherein the at least one storage system comprises an interface that enables each of the plurality of content units to be stored on the at least one storage system, associated with an identifier and later retrieved by providing the at least one storage system with the identifier. The method comprises an act of: (A) creating mapping information that specifies, based on at least some information associated with at least one request to access the at least one content unit, which of the at least two of the formats of the at least one content unit should be provided in response to the request; and (B) storing the mapping information on the computer system.

DETAILED DESCRIPTION

Application programs frequently generate content in a format that is understandable to the application program. For example, word processing application programs generate content units (e.g., documents) that have a specific data format, such that the word processing application program may read the content unit and properly display the document to a user. Thus, for example, Microsoft Word™ may store content units in one data format, while Corel WordPerfect™ may store content units in another data format. Sometimes, a user may wish to read, using an application program, content units stored on a storage system that were created by a different application program or an earlier version of the application program that stored the content unit in a different format. The user's application program may not be capable of reading these content units when they are stored in a format that is foreign to the application program.

In addition, it may be desirable for any of numerous reasons that a content unit stored on a storage system be returned to a host computer requesting the content unit in a data format different from that in which it was stored (e.g., a format desired by the requesting host computer). Examples of reasons for performing such a conversion before the data is returned to the host may include reducing the amount of content that is transferred from the storage box to the host computer and/or to conserve processing resources on the host computer (i.e., so that the host computer need not perform the data conversion). For example, a content unit may include an image stored in TIFF format, which is a lossless format (i.e., there is no image quality loss due to compression). A host computer accessing the content unit may desire that the content unit be returned in JPEG format, a lossy data format, so that the amount of content transferred from the storage system is reduced and/or so that the host computer need not convert the TIFF image to a JPEG image using its own processing resources. As another example, the "host computer" requesting the content unit may be a cellular phone with limited resources to process and display the content of the content unit. Thus, the storage system may return the content unit in a "stripped down" format so that the content unit is more easily processed by the cellular phone.

Some embodiments of the invention address the issues discussed above. However, it should be appreciated that not every embodiment of the invention addresses all of the above-discussed issues and some embodiments are not specifically directed to addressing any of them.

In one embodiment, a storage system may be populated with content units that are stored in a particular data format (e.g., by a legacy version of an application program). A user may desire to read these content units using an application program (e.g., a more recent version of the legacy application program) that is incapable of processing the content units in the data format in which they are stored. Thus, the content units may be converted to a data format in which the user's application program is capable of reading them. Such conversion may take place on any suitable computer in the computer system, such as, for example, the storage system on which the content units are stored, on a utility computer in the computer system, or one the host computer on which the application program executes.

In one embodiment, a utility that executes on the storage system or a utility computer may convert content units stored in a particular data format to a different data format. The utility may be installed by a system administrator and may be configured to locate content units in a first data format, convert the content units to a second data format, and store the content units in the second data format.

In another embodiment, a utility may convert content units stored on the storage system in a first data format to a second data format "on the fly," i.e., in response to a read request for a content unit stored in the second data format. Thus, for example, an application program executing on a host computer may send an access request for a content unit stored on the storage system in a data format that is foreign to the application program. In response to the host computer issuing the access request, the utility may convert the content unit to a data format in which the application program is capable of reading the content unit and the converted content unit may be returned in response to the request.

The decision of which version of a content unit to return in response to a read request for the content unit (i.e., in embodiments in which there are multiple versions of a content unit stored on the storage system in different data formats) and/or the decision of whether to convert a content unit to a different data format in response to a read request for the content unit (i.e., in embodiments in which content units are converted on the fly) may be made in any suitable way. In one embodiment, the information may be provided in an access request for a content unit that enables a utility to select a format in which to provide the content unit in response to the request. The content unit may be returned from the storage system in the selected format.

In one embodiment, mapping information may be created that maps the information provided in the access request to a particular data format. This mapping information may be used to select a data format in which to return a stored content unit when an access request for the content unit is received. The metadata may be stored on any suitable computer in the computer system, such as, for example, the storage system on which the requested content unit is stored, a utility computer, and/or the host computer on which the application program that originated the request executes.

The conversion of a content unit from one format to another format may be performed in any suitable way, and at any suitable time, as the invention is not limited in these respects.

In one embodiment, a content unit may be converted from the format in which it is stored to a different format in response to a request to access the stored content unit. For example, in FIG. 1, computer system 100 includes a storage system 101 and a host computer 103. Storage system 101 may include storage devices 105 and a content unit converter 107. Storage system 101 may be any suitable type of storage system, such as for example, a block I/O storage system, an object addressable storage (OAS) system, and/or any other type of storage system. Host computer 103 may be any suitable type of computer, such as, for example, a server, a personal computer, and/or any other type of computer.

Figure 1:
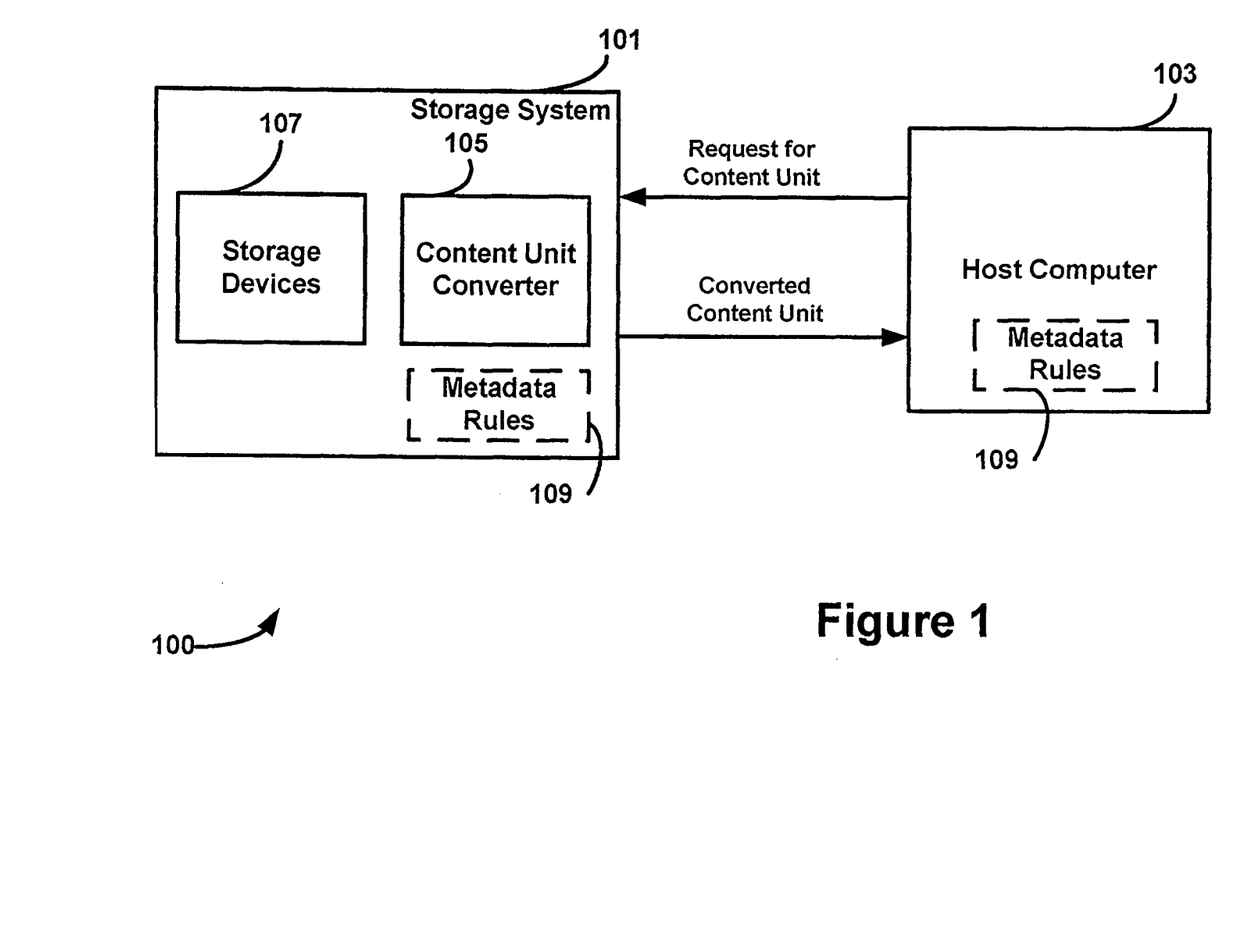
FIG. 1 is a block diagram of a computer system in which content units may be converted to different data formats by a storage system, in accordance with one embodiment of the invention.

Host computer 103 may send a request to access a content unit stored on storage system 101. In response, storage system 101 may access the content unit from one or more of storage devices 105, use content unit converter 107 to convert the content unit to a data format different from the format in which it is stored, and return the converted content unit to host computer 103.

Figure 2:
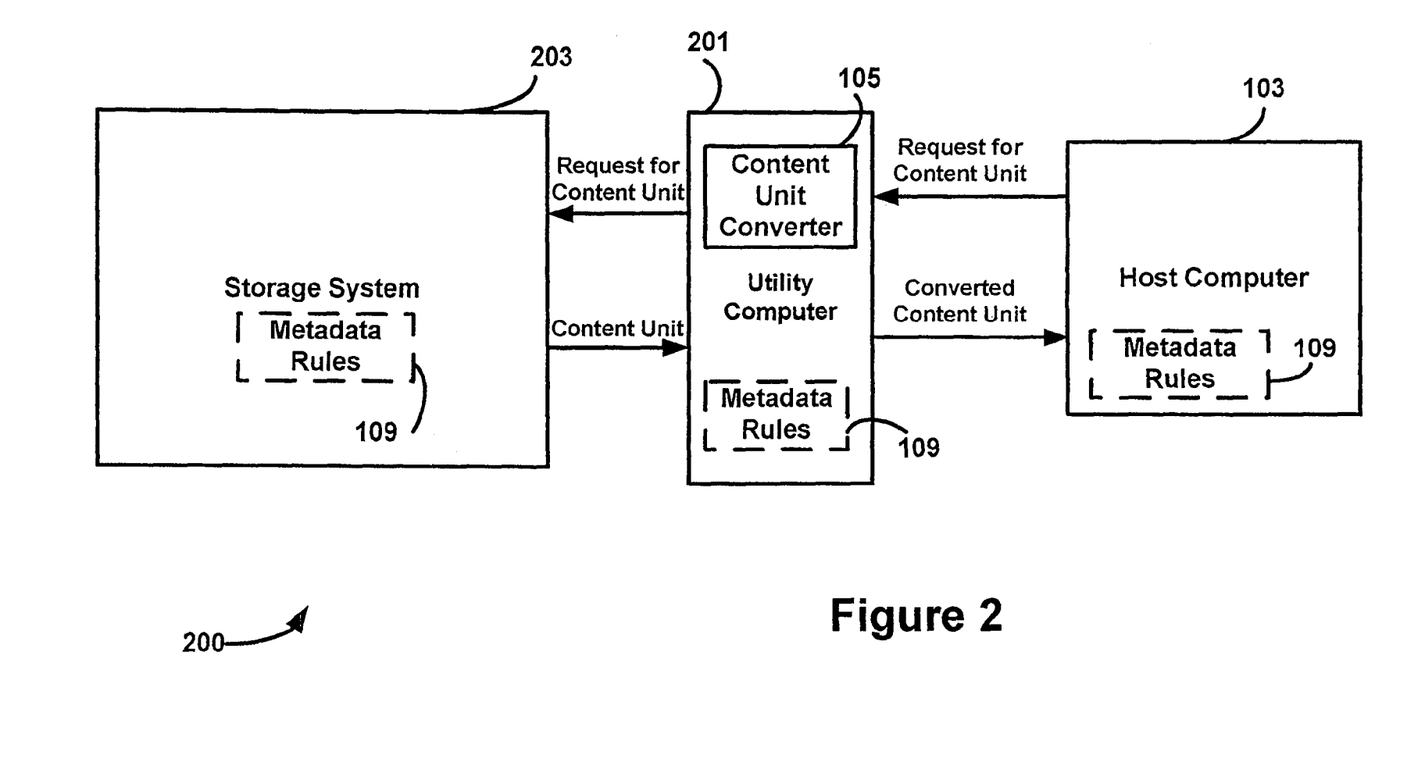
FIG. 2 is a block diagram of a computer system in which content units may be converted to different data formats by a utility computer, in accordance with one embodiment of the invention.

In the example above, the storage system itself converts a requested content unit to a data format different from its stored format prior to returning the content unit in response to the request. However, the invention is not limited in this respect, as the conversion of the content unit may be performed by a computer outside the storage system. This may be done in any suitable way, as the invention is not limited in this respect. For example, as shown in FIG. 2, computer system 200 includes a storage system 203, a utility computer 201, and a host computer 103. Utility computer 201 has a content unit converter 105 that converts content units from one data format to a different data format.

In the example of FIG. 2, host computer 103 may send an access request for a content unit. In one embodiment, the request may be sent to utility computer 201, and utility computer 201 may forward the access request to storage system 203. In another embodiment, the request may be directed to the storage system, but may be intercepted by the utility computer and then forwarded from the utility computer to the storage system so that it appears to the storage system that request originated from the utility computer.

The storage system may return the content unit, in the format in which it is stored (or any other format), to utility computer 201. Utility computer 201 may receive the requested content unit from the storage system, convert the content unit to a different data format (e.g., using content unit converter 105), and may return the converted content unit to host computer 103.

In the example of FIG. 2, host computer 103 provides an access request directly to utility computer 201, which forwards the access request to the storage system. However, the invention is not limited in this respect, as host computer 103 may bypass utility computer 201 and provide the access request to the storage system. The storage system may provide the requested content unit to utility computer 201 for conversion and utility computer 201 may either return the converted content unit to host computer 103 or may return the converted content unit to the storage system, which may return the converted content unit to host computer 103.

Utility computer 201 may be any suitable type of computer, as the invention is not limited in this respect. For example, utility computer 201 may be a server, a personal computer, an appliance, a network switch, or any other suitable type of computer. In one embodiment, utility computer 201 may be a computer that implements a CAS layer. Computers that implement a CAS layer are described in greater detail in application Ser. Nos. 10/836,415, 10/837,311, and 10/836,502, listed below in Table 1, each of which is incorporated herein by reference in its entirety.

When it is determined that a requested content unit is to be converted to a different data format, the conversion may be performed in any suitable way, as the invention is not limited in this respect. For example, in one embodiment, metadata 109 that specifies rules for converting a content unit from one data format to a different data format may be used. These metadata rules may be stored on any suitable computer in the computer system, such as for example a storage system, a utility computer, and/or a host computer, as indicated by the dashed lines in FIGS. 1 and 2.

Figure 3:
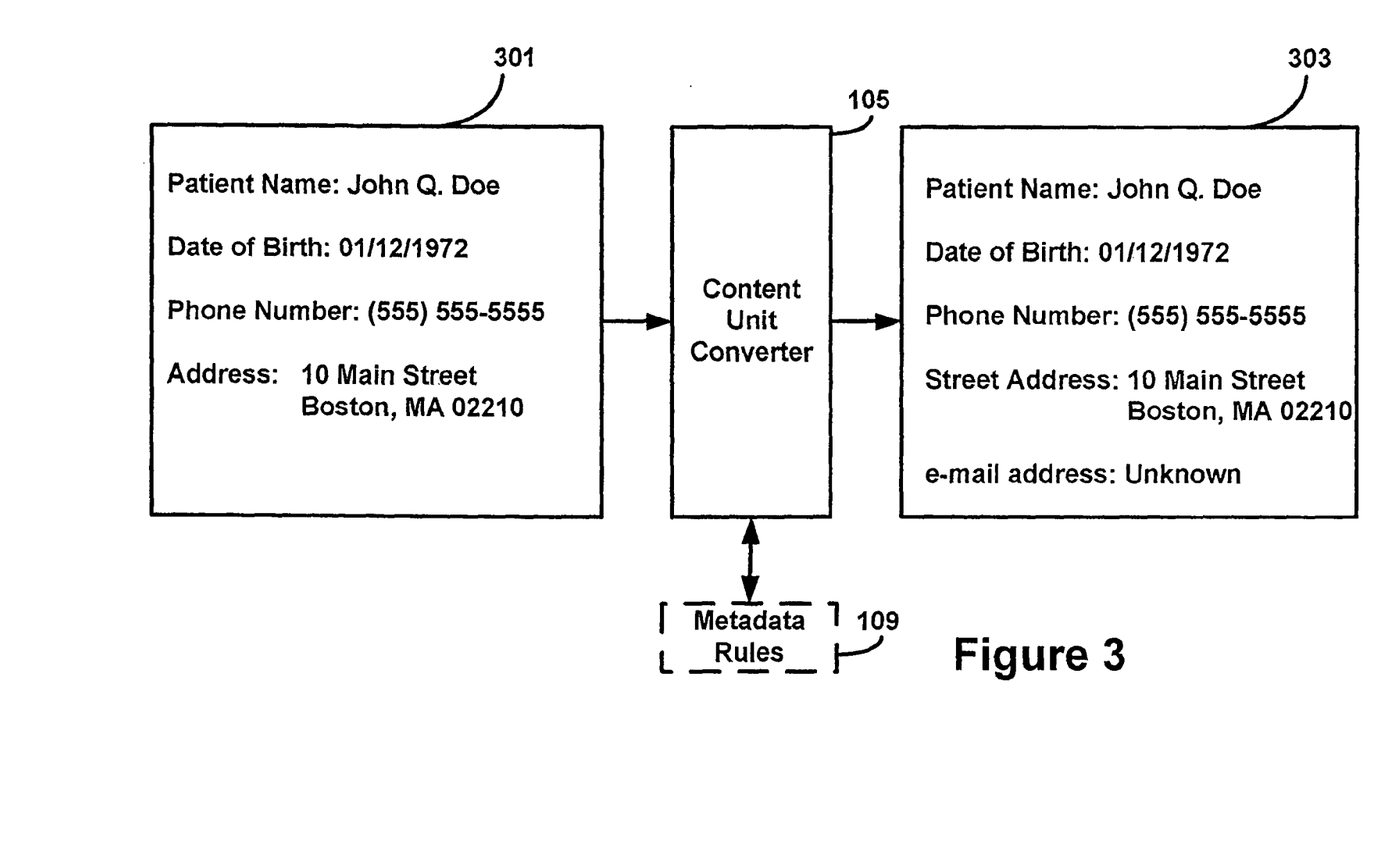
FIG. 3 is a diagram of a content unit being converted to a different data format, in accordance with one embodiment of the invention.

An example of a format conversion is shown in FIG. 3. Content unit 301 may store patient contact information for a medical practice in a first data format. The first data format includes four fields: name; date of birth; phone number; and address. Content units 301 may be input to content unit converter 105, which applies the rules specified in metadata 109 to convert content unit 301 to a different format. Content unit converter 105 may output content unit 303, which is an example of content unit 301 converted to a second data format different from the first data format The second data format includes five fields: name, date of birth, phone number; address; and e-mail address. Metadata may be stored that provides rules for converting a content unit in the first data format (e.g., content unit 301) to a content unit in the second data format (e.g., content unit 303). For example, the metadata may indicate that to convert a content unit from the first data format to the second data format, a fifth field for e-mail address may be added to the end of the content of the content unit and the field may be given a value of unknown.

The metadata that provides rules for converting a content unit from a first data format to a second data format may be stored in any suitable format, as the invention is not limited in this respect. In one embodiment, the metadata may be stored as an extensible stylesheet language (XSL) stylesheet, although other formats are possible.

Content unit converter 105 may be implemented in any suitable way, as the invention is not limited in this respect. For example, content unit converter 105 may be a hardware or software utility. In one embodiment, the utility may be implemented as a layered software driver on the storage system, utility computer, and/or host computer, although other implementations are possible.

When a content unit is converted from a first data format to a second data format, the content unit in the second data format may be returned to the requesting entity (e.g., an application program executing on host computer 103). In one embodiment, the content unit having the second data format may, in addition, be saved on storage system 101, so that storage system 101 stores the content unit in both the first data format and the second data format. In another embodiment, the content unit having the second data format may not be saved to the storage system, so that only the content unit having the first data format is stored on the storage system. In yet another embodiment, the content unit having the second data format may be stored on the storage system and the content unit having the first data format may be deleted from the storage system, so that only the content unit having the second data format is stored on the storage system.

When a request to access a content unit is received, the determination whether to convert a content unit to a different format and to what format to convert a content unit may be made in any suitable way, as the invention is not limited in this respect.

For example, in one embodiment, when an application program (e.g., executing on a host computer or other computer) logs in to the storage system, the application program may specify a profile. Metadata that indicates the format in which a content unit is to be returned may be associated with the profile. For example, the metadata may indicate that, for a particular profile, content units having a certain data format are to be converted to another data format.

Thus, an application program that is logged into the storage system under a certain profile may send an access request to the storage system that includes information identifying the application program that originated the request. The storage system may determine (e.g., based on the information in the access request provided by the host computer), the identity of the application program that originated the request, determine the profile under which the application is logged in, locate the metadata associated with that profile, and determine, based on the metadata associated with the profile, the format in which to return the requested content unit.

In another embodiment, information provided in the access request for the content unit may be used to determine whether to convert a content unit and to what format to convert the content unit in response to a read request for the content unit. The information may directly specify the format in which the content unit is to be returned. Alternatively, Metadata may be stored that maps the information in the access request to a particular data format. The metadata may be stored on any suitable computer in the computer system, as the invention is not limited in this respect. For example, this metadata may be stored on storage system 101, utility computer 201, and/or host computer 103.

The metadata may map any suitable information in the access request to a data format in which the content unit is to be returned in response to the access request, as the invention is not limited in this respect. For example, in one embodiment, the access request may include format-related metadata keywords. The metadata may map these format-related keywords to particular data formats of the content unit. For example, the access request may specify "word processing version 5." The metadata may map these keywords to the data format of version 5 of a particular word processing application program. Thus, in response to the request, the content unit may be returned to the host computer in the version 5 data format in response to the request.

Figure 6:
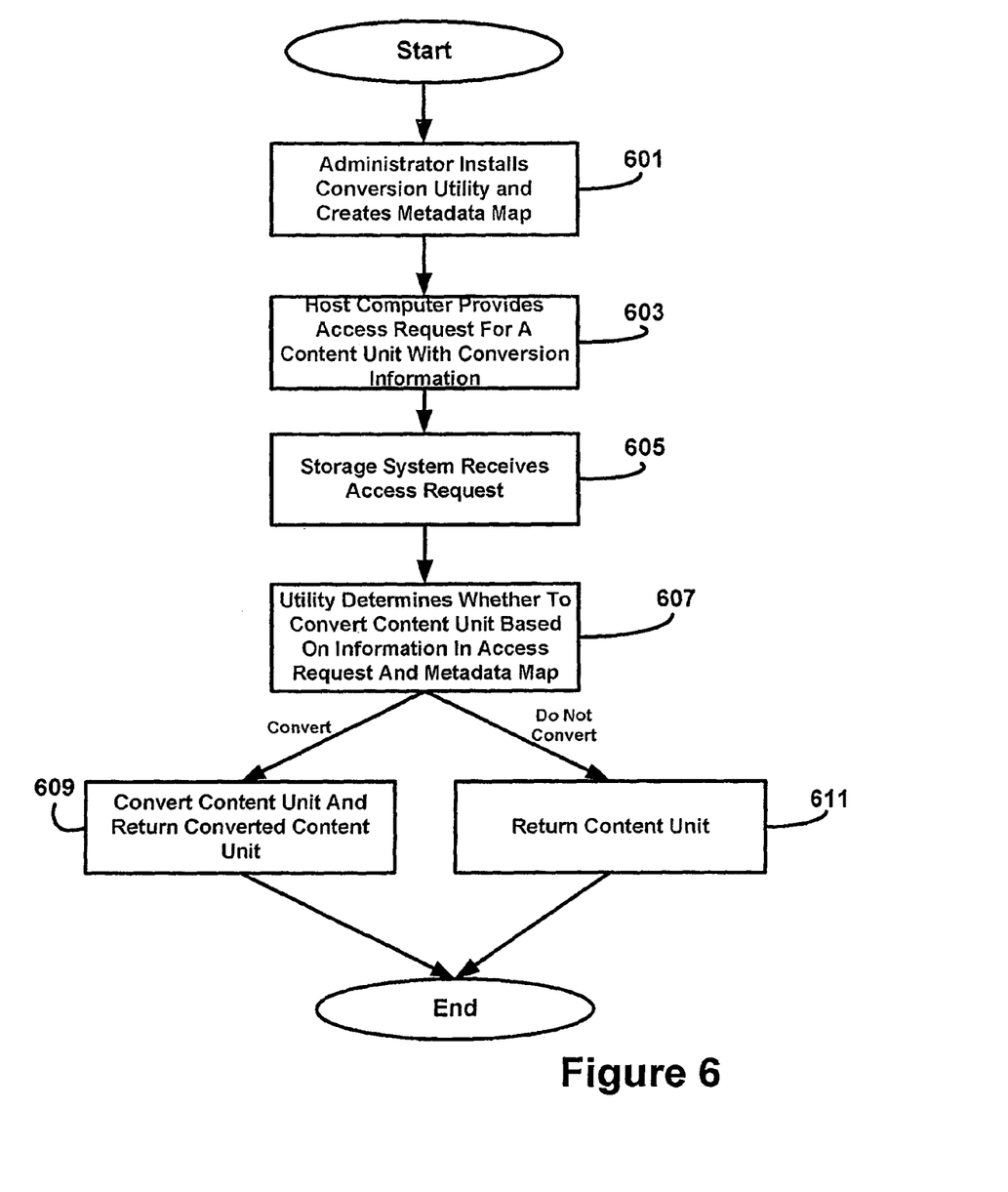
FIG. 6 is a flow chart of a process by which a content unit may be converted to a different data format in response to a read request for the content unit, in accordance with one embodiment of the invention.

FIG. 6 shows an illustrative process by which a content unit may be converted to a different format in response to a read request, in accordance with one embodiment. The process begins at act 601, where a system administrator installs a utility that is capable of converting content units from a first data format to a second data format. The administrator may also create metadata for mapping a profile and/or information in an access request to a particular data format. The utility and the metadata map may be installed on any suitable computer in the computer system, such as the storage system, a utility computer, and/or a host computer.

The process then continues to act 603, where the host computer sends an access request for a content unit to the storage system. The access request may include any suitable information, such as, for example, the identity of an application program and/or the host that originated the request, and/or format-related metadata keywords.

The process next continues to act 605, where the storage system receives the request. After the storage system receives the request, the process continues to act 607 where the utility determines whether to convert the content unit to a different format. As discussed above, this determination may be made in any suitable way, as the invention is not limited in this respect. For example, the utility may use information in the metadata map and/or information in the access request to make the determination. If the utility determines that the content unit should be converted, the process continues to act 609 where the utility converts the content unit to the different data format and the converted content unit is returned in response to the request.

When, at act 607, the utility determines that the content unit is not to be converted to a different format, the process continues to act 611 where the original content unit is returned in the format in which it is stored in response to the request.

In another embodiment of the invention, rather than convert a content unit stored on the storage system to a different format when a read request for the content unit is received, a content unit may be converted from a first data format to a second data in place. That is, for example, a content unit having a first data format may be stored on the storage system. The content unit may be converted to the second data format and the content unit having the second data format may be stored on the storage system, either in addition to or as a replacement for the content unit stored in original format. Thus, when a request for the content unit in the second data format is received, the storage system may provide the version of the content unit in the second data format and need not convert the content unit on the fly. This may be done in any suitable way, as the invention is not limited in this respect.

In one embodiment, a utility that converts content units from a first data format to a second data format may iterate over the content units stored on a storage system, locate content units in the first data format, and convert the content units to a second data format. The content unit in the second data format may be in stored in addition to or instead of the content unit in the first data format. The utility may be located on any suitable computer and may be implemented in any suitable way, as the invention is not limited in this respect. In one embodiment, the utility is located on a computer (e.g., the storage system or utility computer) other than the host computer that executes the application program that stored the content units on the storage system.

Figure 7:
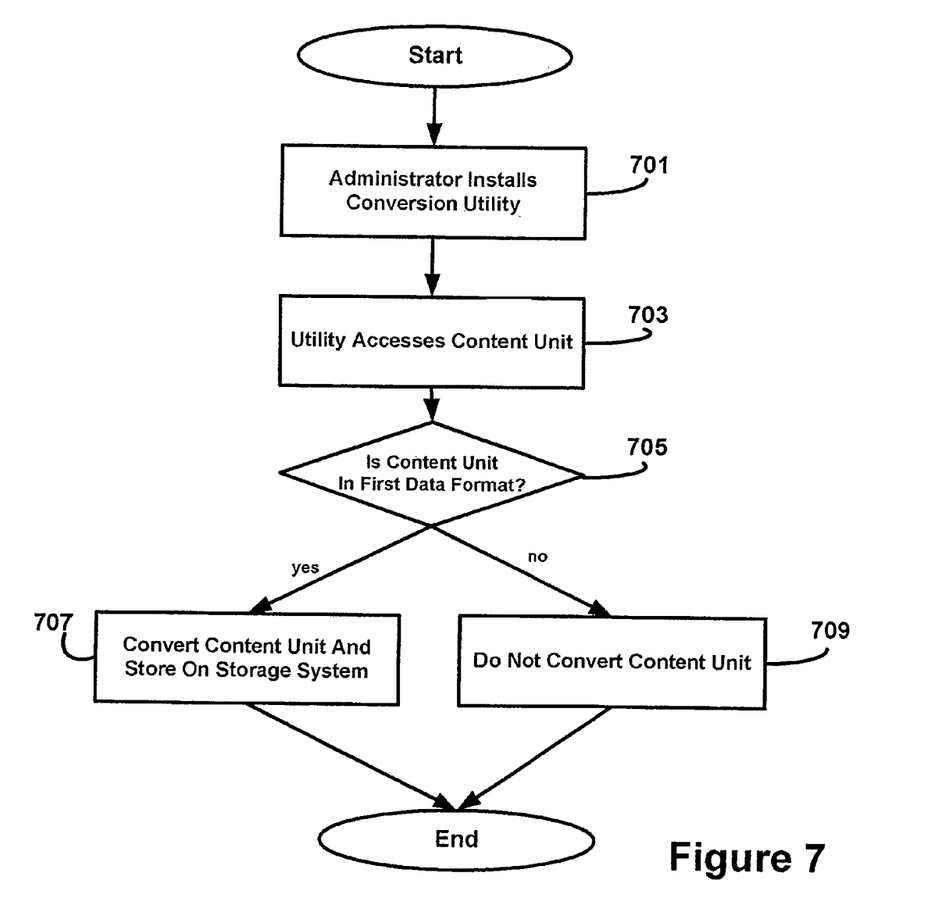
FIG. 7 is a flow chart of a process by which a content unit may be converted to a different data format in place, in accordance with one embodiment of the invention.

FIG. 7 is an example of a process by which a content unit may be converted in place. The process begins at act 701 where an administrator installs a utility that converts content units from a first data format to a second data format. The process then continues to act 703, where the utility accesses a content unit stored on the storage system. The process next continues to act 705, where the utility determines if the accessed content unit is in the first data format. When it is determined that the accessed content unit is in the first data format, the process continues to act 707, where the utility converts the content unit to the second data format and stores the second content unit on the storage system. When it is determined at act 705 that the accessed content unit is not in the first data format, the process continues to act 709 where the utility does not convert the content unit. Acts 703-709 may be repeated for all or some of the content units stored on the storage system.

In one embodiment, the utility may be a software utility that is installed by a system administrator on storage system 101. In another embodiment, the utility may be software utility that is installed by an administrator on utility computer 201. The software utility may request content units from storage system 101, determine if the content units are stored in the first data format, convert content units in the first data format to the second data format, and store the content units converted to the second data format on storage system 101.

In one embodiment, when the version of a content unit having the second data format is stored on the storage system, the original version of the content unit (i.e., the version having the first data format) may be deleted.

In another embodiment, the original version of the content unit may be kept, so that the storage system stores both versions of the content unit.

Figure 4:
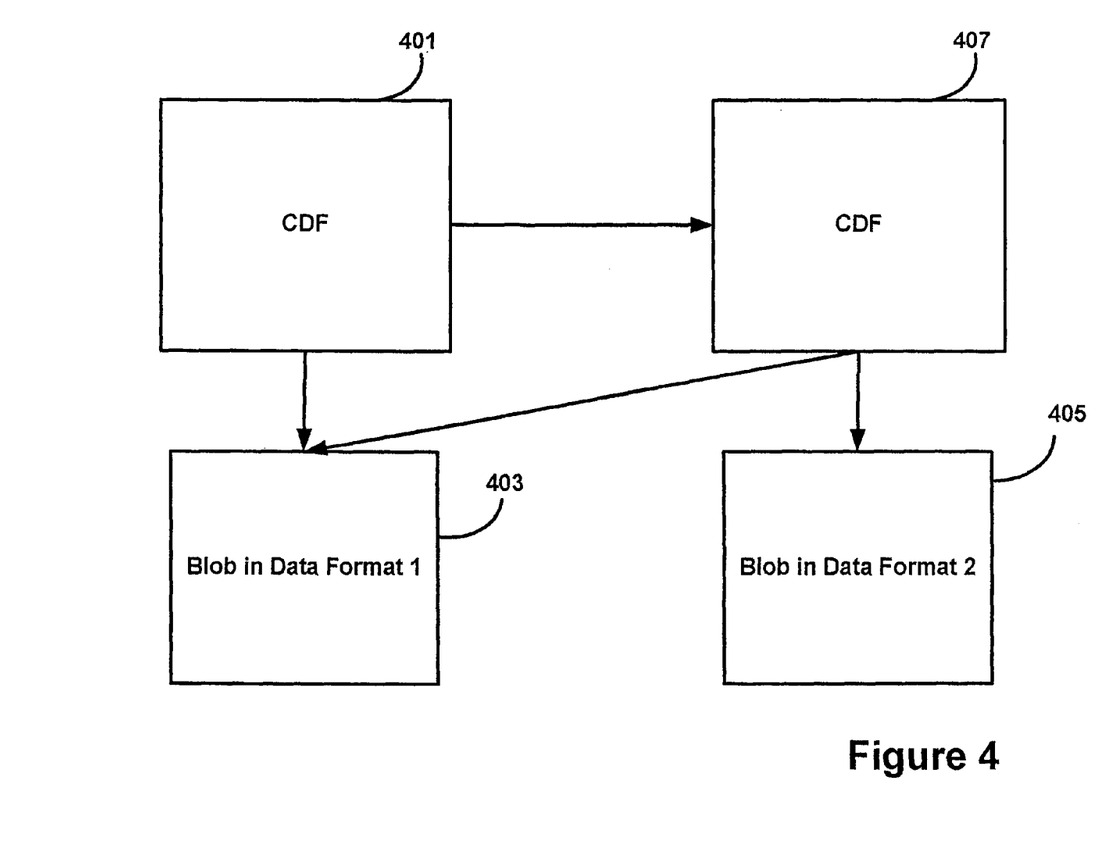
FIG. 4 is a block diagram of multiple versions of a content unit being stored on a storage system that stores content in a CDF/blob arrangement, in accordance with one embodiment of the invention.

In one embodiment, storage system 101 may store at least two types of content units: blobs and content descriptor files (CDFs). Content units that store metadata are referred to herein as CDFs, and may include a reference to one or more separate content units that store the data to which the metadata pertains. Content units that store original (or independent) data are referred to herein as blobs. CDFs may reference and store metadata for any suitable number of blobs, as the embodiments of the invention that employ blobs and CDFS are not limited in this respect. To access a blob, a host computer may access a CDF that references the blob, determine an address (e.g., an object identifier or content address) for the blob from the reference to the blob included in the CDF, and use the address to access the blob. As shown in FIG. 4, a blob 403 stored in a first data format may be referenced by a CDF 401. The blob 403 may be converted to a blob 405 in a second data format in accordance with any of the embodiments described herein, and the blob 405 may be stored on the storage system. In addition, a CDF 407 may be created that includes a reference to both blob 403 and blob 405. Further, a reference to CDF 407 may be added to CDF 401 to signify that there is a newer version of CDF 401 that exists.

Thus, when a host computer attempts to access blob 403 via CDF 401, it may determine that a newer version of CDF 401 exists (i.e., CDF 407). The host computer may then request access to CDF 407 and determine, based on the information in CDF 407, that two versions of the desired blob exist (i.e., blob 403 and blob 405). The host computer may then request access to the version of the blob that is desired.

Figure 5:
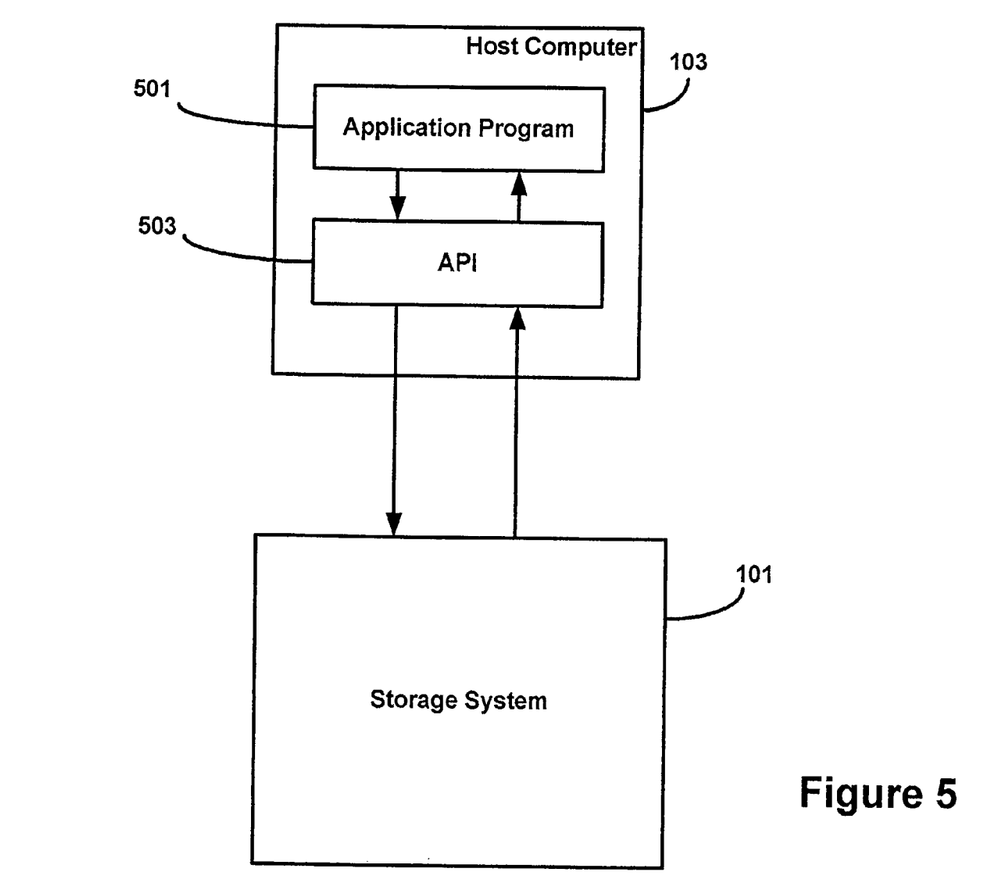
FIG. 5 is a block diagram of a computer system on which an application program executing on a host computer communicates with a storage system via an application programming interface (API)

The host computer may perform these operations in any suitable way. In one embodiment, these operations may be performed by an application programming interface (API) on the host computer, such that selection of a version of the content unit is transparent to the application program. For example as shown in FIG. 5, host computer may execute an application program 501 and an API 503. Application program 501 may communicate with storage system 101 through API 503 (e.g., by calling various routines provided by API 503). Thus, application program 501 need not be aware of the communication protocol used by storage system 101, but rather may use the routines provided by API 503 to communicate with storage system 101.

Thus, for example, application program 501 may call a routine of API 503 that causes API 503 to send an access request to the storage system for CDF 401. In one embodiment, API 503 may send the request for CDF 401 to the storage system and receive the CDF in response. API 503 may recognize, based on the reference to CDF 407 included in CDF 401, that a newer version of CDF 401 exists (i.e., CDF 407). API 503 may then request access to CDF 407 and determine, based on the information in CDF 407, that two versions of the desired blob exist (i.e., blob 403 and blob 405). API 503 may determine whether to return blob 403 or blob 405 to application program 501, send an access request to storage system 101 for the desired blob, and return this blob to application program 501.

It should be appreciated that blob/CDF arrangement is but one example of a way that content units may be stored and the invention is not limited to this or any other arrangement.

In embodiments in which there are multiple versions of a content unit stored on the storage system, the determination of which version of the content unit to provide in response to a read request for the content unit may be made in any suitable way, as the invention is not limited in this respect.

Figure 8:
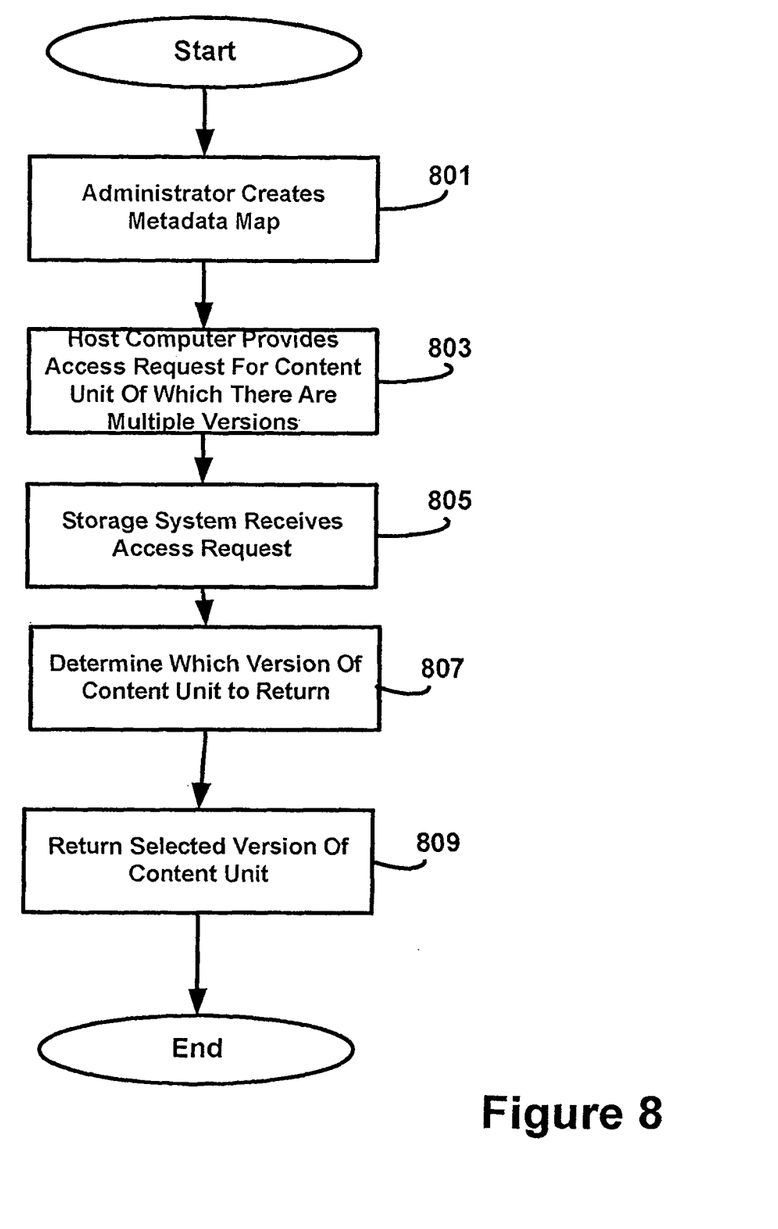
FIG. 8 is a flow chart of a process to determine which of multiple versions of a content unit may be returned in response to a read request for the content unit, in accordance with one embodiment of the invention.

FIG. 8 shows an example of a process by which one of multiple versions of a content unit may be selected and returned in response to a read request for the content unit. The process begins at act 801, where an administrator creates metadata that maps information provided in an access request to a particular data format. The process then continues to act 803, where a host computer issues an access request for a content unit of which there are stored multiple versions in different data formats. The access request may include information that may be used to select (directly or indirectly as discussed above) one of the data formats to be returned. The process then continues to act 805, where the storage system receives the access request. The process next continues to act 807, where it is determined which version to return. As discussed below in greater detail, this determination may be made by any suitable computer in the computer system and in any suitable way. The process then continues to act 809, where the selected content unit is returned in response to the request.

In one embodiment, information provided in the access request for the content unit may be used to determine which version to provide. Metadata may be stored that maps the information in the access request to a particular version of the content unit. The metadata may be stored on any suitable computer in the computer system, as the invention is not limited in this respect. For example, this metadata may be stored on the storage system, utility computer 201, and/or host computer 103, as discussed above.

The metadata may map any suitable information in the access request to a data format of the content unit, as the invention is not limited in this respect. For example, in one embodiment, the access request may identify the host computer and/or application program that sent the request. The metadata may map the identity of the host computer and/or application program to a particular data format and the version of the content unit in that data format may be returned.

In another embodiment, the access request may include timestamp information. The metadata may map the timestamp information to a particular version of the content unit. For example, the metadata may map a time range to each version of the content unit, where the beginning of the time range for a particular content unit corresponds to the date of creation of the content unit and the end of the time range corresponds to the date of creation of the subsequent version of the content unit. Thus, the version of the content unit to be returned may be selected based on in which time range in the metadata map the timestamp falls.

In another embodiment, the access request may include format-related metadata keywords which indicate a particular data format of the requested content unit, as discussed above. The metadata may map these keywords to particular data formats of the content unit. For example, the access request may specify "word processing version 5." The metadata may map these keywords to the version of the content unit that has the data format of version 5 of a particular word processing application program.

The determination as to which version of a content unit should be provided to the application program may be made on any suitable computer in the computer system, such as for example, storage system 101, utility computer 201, and/or host computer 103.

Storage system 101 may any suitable type of storage system, as the invention is not limited in this respect. For example, in one embodiment, the storage system may be a block I/O storage system. In another embodiment, storage system 101 may be an OAS system.

In some embodiments in which storage system 101 is an OAS system, storage system 101 may be a CAS system in which the object identifier for a content unit is a content address that is computed, at least in part, from at least a portion of the content of the content unit. In embodiments in which storage system 101 is a CAS system, when a host computer receives, from the CAS system, a content unit requested using its content address, the host computer may verify that the content unit has not been modified or corrupted by recomputing the content address from the content of the received content unit and determining whether the recomputed content address matches the content address used to request the content unit from the storage system.

Applicants have appreciated that when the host computer receives a content unit that has been converted to a different format, the host computer may not be able to verify that the content unit has not been corrupted or modified using the content address because the content address was computed from the content of the original version of the content unit. However, when the storage system creates the new version of the content unit, the storage system may generate a new content address for the new version of the content unit. Thus, when the storage system provides the new version of the content unit to a host computer in response to an access request, the storage system may verify that the content unit has not been modified or corrupted using the content address computer for that version of the content unit.

The above-described embodiments of the present invention can be implemented on any suitable computer or storage system. Examples of suitable computers and/or storage systems are described in the patent applications listed below in Table 1 (collectively "the OAS applications"), each of which is incorporated herein by reference. It should be appreciated that the computers and storage systems described in these applications are only examples of computers and storage systems on which the embodiments of the present invention may be implemented, as the invention is not limited to implementation on any of these object addressable storage systems, or to object addressable storage systems at all.

TABLE 1

| Title | Serial No. | Filing Date |
|---|---|---|
| Content Addressable Information, Encapsulation, Representation, And Transfer | 09/236,366 | Jan. 21, 1999 |
| Access To Content Addressable Data Over A Network | 09/235,146 | Jan. 21, 1999 |
| System And Method For Secure Storage Transfer And Retrieval Of Content Addressable Information | 09/391,360 | Sep. 7, 1999 |
| Method And Apparatus For Data Retention In A Storage System | 10/731,790 | Dec. 9, 2003 |
| Methods And Apparatus For Facilitating Access To Content In A Data Storage System | 10/731,613 | Dec. 9, 2003 |
| Methods And Apparatus For Caching A Location Index In A Data Storage System | 10/731,796 | Dec. 9, 2003 |
| Methods And Apparatus For Parsing A Content Address To Facilitate Selection Of A Physical Storage Location In A Data Storage System | 10/731,603 | Dec. 9, 2003 |
| Methods And Apparatus For Generating A Content Address To Indicate Data Units Written To A Storage System Proximate In Time | 10/731,845 | Dec. 9, 2003 |
| Methods And Apparatus For Modifying A Retention Period For Data In A Storage System | 10/762,044 | Jan. 21, 2004 |
| Methods And Apparatus For Extending A Retention Period For Data In A | 10/761,826 | Jan. 21, 2004 |

TABLE 1-continued

| Title | Serial No. | Filing Date |
|---|---|---|
| Storage System Methods And Apparatus For Indirectly Identifying A Retention Period For Data In A Storage System | 10/762,036 | Jan. 21, 2004 |
| Methods And Apparatus For Indirectly Identifying A Retention Period For Data In A Storage System | 10/762,043 | Jan. 21, 2004 |
| Methods And Apparatus For Increasing Data Storage Capacity | 10/787,337 | Feb. 26, 2004 |
| Methods And Apparatus For Storing Data In A Storage Environment | 10/787,670 | Feb. 26, 2004 |
| Methods And Apparatus For Segregating A Content Addressable Computer System | 10/910,985 | Aug. 4, 2004 |
| Methods And Apparatus For Accessing Content In A Virtual Pool On A Content Addressable Storage System | 10/911,330 | Aug. 4, 2004 |
| Methods and Apparatus For Including Storage System Capability Information In An Access Request To A Content Addressable Storage System | 10/911,248 | Aug. 4, 2004 |
| Methods And Apparatus For Tracking Content Storage In A Content Addressable Storage System | 10/911,247 | Aug. 4, 2004 |
| Methods and Apparatus For Storing Information Identifying A Source Of A Content Unit Stored On A Content Addressable System | 10/911,360 | Aug. 4, 2004 |
| Software System For Providing Storage System Functionality | 11/021,892 | Dec. 23, 2004 |
| Software System For Providing Content Addressable Storage System Functionality | 11/022,022 | Dec. 23, 2004 |
| Methods And Apparatus For Providing Data Retention Capability Via A Network Attached Storage Device | 11/022,077 | Dec. 23, 2004 |
| Methods And Apparatus For Managing Storage In A Computer System | 11/021,756 | Dec. 23, 2004 |
| Methods And Apparatus For Processing Access Requests In A Computer System | 11/021,012 | Dec. 23, 2004 |
| Methods And Apparatus For Accessing Information In A Hierarchical File System | 11/021,378 | Dec. 23, 2004 |
| Methods And Apparatus For Storing A Reflection On A Storage System | 11/034,613 | Jan. 12, 2005 |
| Method And Apparatus For Modifying A Retention Period | 11/034,737 | Jan. 12, 2005 |
| Methods And Apparatus For Managing Deletion of Data | 11/034,732 | Jan. 12, 2005 |
| Methods And Apparatus For Managing The Storage Of Content | 11/107,520 | Apr. 15, 2005 |
| Methods And Apparatus For Retrieval Of Content | 11/107,063 | Apr. 15, 2005 |
| Units In A Time-Based Directory Structure Methods And Apparatus For Managing The Replication Of Content | 11/107,194 | Apr. 15, 2005 |
| Methods And Apparatus For Managing the Storage Of Content In A File System | 11/165,104 | Jun. 23, 2005 |
| Methods And Apparatus For Accessing Content Stored In A File System | 11/165,103 | Jun. 23, 2005 |
| Methods And Apparatus For Storing Content In A File System | 11/165,102 | Jun. 23, 2005 |
| Methods And Apparatus For Managing the Storage of Content | 11/212,898 | Aug. 26, 2005 |
| Methods And Apparatus For Scheduling An Action on a Computer | 11/213,565 | Aug. 26, 2005 |
| Methods And Apparatus For Deleting Content From A Storage System | 11/213,233 | Aug. 26, 2005 |
| Method and Apparatus For Managing The Storage Of Content | 11/324,615 | Jan. 3, 2006 |
| Method and Apparatus For Providing An Interface To A Storage System | 11/324,639 | Jan. 3, 2006 |
| Methods And Apparatus For Managing A File System On A Content Addressable Storage System | 11/324,533 | Jan. 3, 2006 |
| Methods And Apparatus For Creating A File System | 11/324,637 | Jan. 3, 2006 |
| Methods And Apparatus For Mounting A File System | 11/324,726 | Jan. 3, 2006 |
| Methods And Apparatus For Allowing Access To Content | 11/324,642 | Jan. 3, 2006 |
| Methods And Apparatus For Implementing A File System That Stores Files On A Content Addressable Storage System | 11/324,727 | Jan. 3, 2006 |
| Methods And Apparatus For Reconfiguring A Storage System | 11/324,728 | Jan. 3, 2006 |
| Methods And Apparatus For Increasing The Storage Capacity Of A Storage System | 11/324,646 | Jan. 3, 2006 |
| Methods And Apparatus For Accessing Content On A Storage System | 11/324,644 | Jan. 3, 2006 |

The above-described embodiments of the present invention can be implemented in any of numerous ways. For example, the embodiments may be implemented using hardware, software or a combination thereof. When implemented in software, the software code can be executed on any suitable processor or collection of processors, whether provided in a single computer or distributed among multiple computers. It should be appreciated that any component or collection of components that perform the functions described above can be generically considered as one or more controllers that control the above-discussed functions. The one or more controllers can be implemented in numerous ways, such as with dedicated hardware, or with general purpose hardware (e.g., one or more processors) that is programmed using microcode or software to perform the functions recited above.

In this respect, it should be appreciated that one implementation of the embodiments of the present invention comprises at least one computer-readable medium (e.g., a computer memory, a floppy disk, a compact disk, a tape, etc.) encoded with a computer program (i.e., a plurality of instructions), which, when executed on a processor, performs the above-discussed functions of the embodiments of the present invention.

The computer-readable medium can be transportable such that the program stored thereon can be loaded onto any computer environment resource to implement the aspects of the present invention discussed herein. In addition, it should be appreciated that the reference to a computer program which, when executed, performs the above-discussed functions, is not limited to an application program running on a host computer. Rather, the term computer program is used herein in a generic sense to reference any type of computer code (e.g., software or microcode) that can be employed to program a processor to implement the above-discussed aspects of the present invention.

It should be appreciated that in accordance with several embodiments of the present invention wherein processes are implemented in a computer readable medium, the computer implemented processes may, during the course of their execution, receive input manually (e.g., from a user).

The phraseology and terminology used herein is for the purpose of description and should not be regarded as limiting. The use of "including," "comprising," "having," "containing", "involving", and variations thereof, is meant to encompass the items listed thereafter and additional items.

Having described several embodiments of the invention in detail, various modifications and improvements will readily occur to those skilled in the art. Such modifications and improvements are intended to be within the spirit and scope of the invention. Accordingly, the foregoing description is by way of example only, and is not intended as limiting. The invention is limited only as defined by the following claims and the equivalents thereto.

What is claimed is:

1. A method for use in a computer system, comprising:
coupling at least one storage system and at least one host computer via an interface, wherein the at least one host computer executes an application program that writes a plurality of content units to the at least one storage system, wherein the at least one storage system stores the plurality of content units in a first stored format, and wherein the interface provides a content addressable storage layer in which a content address of a particular content unit is based, at least in part, on content provided in the particular content unit;
executing on at least one computer other than the at least one host computer at least one utility that reads at least some of the plurality of content units and stores the at least some of the plurality of content units on the at least one storage system in a second stored format that is different from the first stored format without replacing the at least some of the plurality of content units stored in the first stored format, wherein the at least some of the plurality of content units stored in the first stored format, that are not replaced by the at least some of the plurality of content units stored in the second stored format, include content units stored in the first stored format that are substantially a same version of content units stored in the second stored format that are included in the at least some of the plurality of content units stored in the second stored format;
in response to a request, determining a version of at least one content unit that is responsive to the request, wherein the version corresponds to a format of the at least one content unit that is requested according to the request; and
verifying that the at least one content unit in the requested format has not been corrupted using the content address for the version of the at least one content unit that is stored on the at least one storage system and the content address that is responsive to the request.

2. The method of claim 1, wherein executing the at least one utility includes executing the at least one utility on the at least one storage system.

3. The method of claim 1, wherein executing the at least one utility includes executing the at least one utility on the interface.

4. The method of claim 1, wherein executing the at least one utility includes executing the at least one utility on at least one appliance that is separate from the at least one storage system and the at least one host computer.

5. The method of claim 1, wherein the application program is a first application program, wherein the second stored format is compatible with a second application program, and wherein the first stored format is incompatible with the second application program.

6. At least one non-transitory computer readable medium encoded with instructions that, when executed on a computer system, performs a method comprising:
coupling at least one storage system and at least one host computer via an interface, wherein the at least one computer executes an application program that writes a plurality of content units to the at least one storage system, wherein the at least one storage system stores the plurality of content units in a first stored format, and wherein the interface provides a content addressable storage layer in which a content address of a particular content unit is based, at least in part, on content provided in the particular content unit;
executing on at least one computer other than the at least one host computer at least one utility that reads at least some of the plurality of content units and stores the at least some of the plurality of content units on the at least one storage system in a second stored format that is different from the first stored format without replacing the at least some of the plurality of content units stored in the first stored format, wherein the at least some of the plurality of content units stored in the first stored format, that are not replaced by the at least some of the plurality of content units stored in the second stored format, include content units stored in the first stored format that are substantially a same version of content units stored in the second stored format that are included in the at least some of the plurality of content units stored in the second stored format;
in response to a request, determining a version of at least one content unit that is responsive to the request, wherein the version corresponds to a format of the at least one content unit that is requested according to the request; and
verifying that the at least one content unit in the requested format has not been corrupted using the content address for the version of the at least one content unit that is stored on the at least one storage system and the content address that is responsive to the request.

7. The at least one non-transitory computer readable medium of claim 6, wherein executing the at least one utility includes executing the at least one utility on the at least one storage system.

8. The at least one non-transitory computer readable medium of claim 6, wherein executing the at least one utility includes executing the at least one utility on the interface.

9. The at least one non-transitory computer readable medium of claim 6, wherein executing the at least one utility includes executing the at least one utility on at least one appliance that is separate from the at least one storage system and the at least one host computer.

10. The at least one non-transitory computer readable medium of claim 6, wherein the application program is a first application program, wherein the second stored format is compatible with a second application program, and wherein the first stored format is incompatible with the second application program.

11. In a computer system, at least one storage system comprising:
- at least one interface that couples the at least one storage system to at least one host computer in the computer system, wherein the at least one host computer is capable of executing an application program that writes a plurality of content units to the at least one storage system, and wherein the interface provides a content addressable storage layer in which a content address of a particular content unit is based, at least in part, on content provided in the particular content unit;
- at least one storage device that stores the plurality of content units in a first stored format; and
- at least one controller that: executes at least one utility that reads at least some of the plurality of content units and stores the at least some of the plurality of content units on the at least one storage system in a second stored format that is different from the first stored format without replacing the at least some of the plurality of content units stored in the first stored format, wherein the at least some of the plurality of content units stored in the first stored format, that are not replaced by the at least some of the plurality of content units stored in the second stored format, include content units stored in the first stored format that are substantially a same version of content units stored in the second stored format that are included in the at least some of the plurality of content units stored in the second stored format;
- in response to a request, determines a version of at least one content unit that is responsive to the request, wherein the version corresponds to a format of the at least one content unit that is requested according to the request; and
- verifies that the at least one content unit in the requested format has not been corrupted using the content address for the version of the at least one content unit that is stored on the at least one storage system and the content address that is responsive to the request.

12. The at least one storage system of claim 11, wherein the application program is a first application program, and wherein the second stored format is compatible with a second application program.

13. The at least one storage system of claim 11, wherein the first and second application programs are different versions of an application program that performs substantially the same functions.

14. The at least one storage system of claim 11, wherein the second stored format is incompatible with the first application program.

* * * * *